United States Patent [19]

Thiel

[11] Patent Number: 4,582,462
[45] Date of Patent: Apr. 15, 1986

[54] PLASTIC PROTECTING CAP FOR A POLYGON NUT

[76] Inventor: Horst Thiel, Lösenbacher Landstrasse 168, 5880 Lüdenscheid 6, Fed. Rep. of Germany

[21] Appl. No.: 654,946

[22] Filed: Sep. 27, 1984

[30] Foreign Application Priority Data

Oct. 1, 1983 [DE] Fed. Rep. of Germany ....... 3335723

[51] Int. Cl.⁴ .................. A47G 3/00; F16B 37/14
[52] U.S. Cl. .................... 411/371; 411/373; 411/377; 411/431; 411/907
[58] Field of Search ............ 411/371, 373, 375, 429, 411/430, 431, 1, 6, 7, 432, 374, 372, 377, 907, 904

[56] References Cited

U.S. PATENT DOCUMENTS

| | | | |
|---|---|---|---|
| 1,254,514 | 1/1918 | Lehmann | 411/429 |
| 1,694,459 | 12/1928 | Volckhausen | 411/432 |
| 2,551,834 | 5/1951 | Ferguson | 411/431 X |
| 2,819,642 | 1/1958 | Refrigeri | 411/373 |
| 3,548,704 | 12/1970 | Kutryk | 411/373 |

FOREIGN PATENT DOCUMENTS

| | | | |
|---|---|---|---|
| 2327552 | 12/1974 | Fed. Rep. of Germany | 411/429 |
| 2447575 | 4/1976 | Fed. Rep. of Germany . | |
| 2905297 | 9/1979 | Fed. Rep. of Germany . | |
| 3042213A1 | 1/1982 | Fed. Rep. of Germany . | |
| 2386722 | 12/1978 | France | 411/375 |
| 600879 | 12/1959 | Italy | 411/429 |
| 636531 | 3/1962 | Italy | 411/429 |
| 1536598 | 12/1978 | United Kingdom | 411/371 |

*Primary Examiner*—Kenneth J. Dorner
*Assistant Examiner*—Rodney M. Lindsey
*Attorney, Agent, or Firm*—Bacon & Thomas

[57] ABSTRACT

A plastic protecting cap for the clamping on a polygon nut, with a cylinder casing, which overlaps the polygon nut. The technical problem of the present invention is the provision of a plastic protecting cap, which, by a turning movement, can be clamped safely and firmly on the polygon nut and can be released therefrom by turning in opposite direction again. On the internal face of the casing, at least, two axial profile webs are arranged at places corresponding to polygonal corners, each web comprises a groove profile, open against the axis, with a vertex angle equal to the polygon angle, the radial distance of the vertex of each groove profile from the profile axis being slightly smaller than the radial distance of each corner of the polygon nut profile from the profile axis, and one flange surface of the groove profile is longer, in circumferential direction, than the other flange surface.

8 Claims, 4 Drawing Figures

PLASTIC PROTECTING CAP FOR A POLYGON NUT

BACKGROUND OF THE INVENTION

1. Field of the Invention

The invention relates to a plastic protecting cap for the clamping on a polygon nut, with a cylinder casing, which overlaps the polygon nut.

2. Description of the Prior Art

Such plastic protecting caps for polygon nuts, particularly hexagon nuts, are known already by numerous embodiments, see U.S. Pat. No. 3,548,704. However, the mounting of such plastic protecting caps and particularly the detaching thereof is difficult, if the nut is hardly accessible. That is particularly true for the wheel bolts of trucks and the like, where the threaded bolts and the hexagon nuts are situated in holes of a covering ring. These holes are just so large that one can take hold of the hexagon nut by a socket wrench. However, it is absolutely impossible to get under the face edge of the plastic protecting cap by a tool, in order to remove the cap.

SUMMARY OF THE INVENTION

An object of the invention is the provision of a plastic protecting cap, which can be clamped safely and firmly on the polygon nut by a turning movement and can be released therefrom again by turning in opposite direction.

According to the invention this object is achieved in that on the internal face of the casing at least two axial profile webs are arranged at places corresponding to the polygonal corners, each web comprises a groove profile, open against the axis, with a vertex angle equal to the polygon angle, the radial distance of the vertex of each groove profile from the profile axis being slightly smaller than the radial distance of each corner of the polygon nut profile from the profile axis, and that one flange surface of the groove profile is longer, in circumferential direction, than the other flange surface.

The present invention differs in a non-obvious manner from the prior art in that frictionally and positively form-locking clamping axial profile webs are provided, which, in fact, allow in the circumferential direction a tightening movement and a loosening movement, but secure in the axial direction due to the large contact area and the tensioning force a frictional connection between plastic protecting cap and polygon nut. In each case the shorter flange surface of the groove profile can be pressed in the turning movement over the specific edge of the polygon nut, the cylinder casing being deformed elastically accordingly. The longer flange surface avoids an overturning of the plastic protecting cap over the edge of the polygon profile. For the loosening of the plastic protecting cap same is turned back in the opposite direction.

In detail the invention provides that the shorter flange surface, in the circumferential direction, has a width which corresponds to 10 to 20% of the lateral length of the polygon profile. It is secured by this dimensioning that during the tightening movement of the plastic protecting cap merely an elastic deformation of the cylinder casing occurs, whereby the portions of the cylinder casing are extended along the chord between adjacent axial profile webs.

In order to guarantee a secure clamping effect and holding force, the invention provides that the radial distance of each vertex is 3 to 5% smaller than the radial distance of the corners of the polygon nut profile. Thereby a resilient clamping on of the plastic protecting cap with large friction areas is secured.

Specifically the invention provides that the polygon nut profile is a hexagon nut profile, and that six axial profile webs are provided.

The invention can be utilized for square nuts as well as for hexagon nuts. In the following the term hexagon nut also includes all other polygon nuts.

For a hexagon nut the plastic protecting cap may comprise two, three, or six axial profile webs. If there are six axial profile webs, one refers in each case to the diagonal distance of diametrically arranged vertices of the groove profiles and to the length of the diagonals of the hexagon nut profile.

A preferred dimensioning is seen in that the width of the shorter flange surface in the circumferential direction is 12% of the side length of the hexagon profile. In the case of this dimensioning the width of the specific shorter flange surface is defined in such a manner that the arc sections of the cylinder casing between two axial profile webs can deform during the tightening movement just into a chord. An unelastic excessive elongation is avoided.

In order to exclude an overturning of the plastic protecting cap, it is provided that the longer flange surface in the circumferential direction, has a width which exceeds 15% of the side length of the hexagon nut profile. The longer flange surface joins closely on the side wall of the hexagon nut profile and thereby limits the tightening movement. A further turning with excessive force could lead merely to a destruction of the plastic protecting cap.

For a simple handling of the plastic protecting cap it is provided that subsequent to the cylinder casing a stepped head portion with a hexagon profile similar to the hexagon nut profile of the hexagon nut is provided. Thereby it is reached that the plastic protecting cap can be operated with the same wrench as the hexagon nut.

The handling is especially promoted in that the shorter flange of each groove profile is oriented in each case in the tightening direction of the hexagon nut. Thereby it is reached that the plastic protecting cap can be clamped on in the tightening direction of the hexagon nut and can be detached in the loosening direction of the hexagon nut.

BRIEF DESCRIPTION OF THE DRAWING

One embodiment of the invention will be described in the following with reference to the accompanying drawing, wherein.

DESCRIPTION OF THE PREFERRED EMBODIMENT

Figure 1:
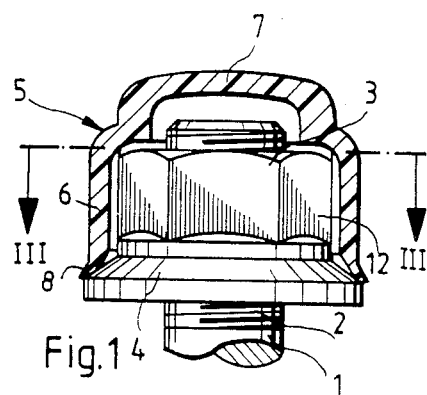
FIG. 1 shows a section through the plastic protecting cap in the clamped condition on a hexagon nut.

The figures show a hexagon nut embodying the present invention. A bolt 1 with a threaded portion 2 is shown. It may be a bolt 1 on the hub of a truck wheel, which serves for the mounting of a wheel rim. The hub itself as well as the wheel rim and the covering ring are not shown. On the threaded portion 2 a hexagon nut 3 with a washer 4 is screwed, by which the wheel rim is held on the wheel hub. The corners 13 of the hexagon nut 3 are situated on the corners of a hexagon nut profile 12.

For the covering and for the protecting of the screw connection a plastic protecting cap 5 is provided, which comprises a cylinder casing 6 and a head portion 7. On the front face of the cylinder casing 6 a sealing lip 8 is provided, which sealingly contacts the washer 4.

Figure 3:
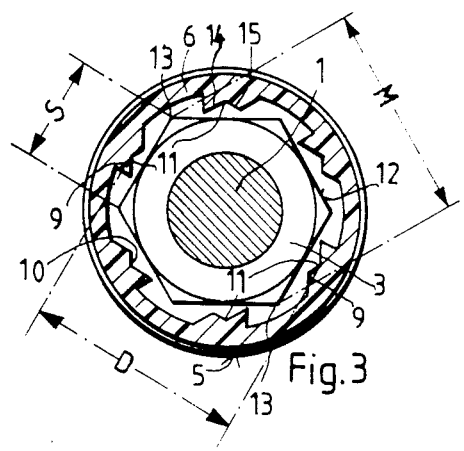
FIG. 3 shows a section along line III—III with an illustration of the plastic protecting cap in the loosened condition, whilst
Figure 4:
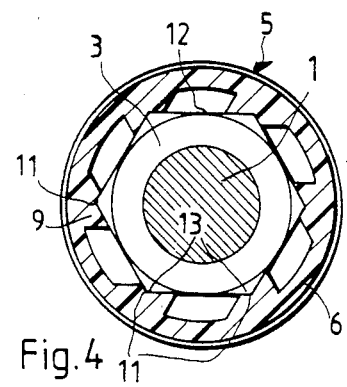
FIG. 4 is a corresponding sectional view of the protective cap in the clamped condition.

The configuration of the cylinder casing 6 can be seen particularly from FIGS. 3 and 4. From the casing internal face in each case at equal angular distances axial profile webs 9 project, which comprise a groove profile 10 with a vertex 11. The groove profile 10 itself extends over the whole axial length of the cylinder casing 6. The value of the vertex angle is 120° according to the angle between two sides of the hexagon nut profile 12 of the hexagon nut 3 or briefly, the hexagon nut profile angle. Six axial profile webs 9 are shown. The diagonal distance D of the vertices 11 of diametrically situated profile webs 9 is slightly smaller than the distance or the diagonal length M between diametrical corners 13 of the hexagon nut profile 12 of the hexagon nut 3. The distance is preferably 3 through 5% smaller. Then a sufficient holding force by the elastic tension of the cylinder casing is secured. In the case of this hexagon geometry one may utilize in each case instead of the double radial distance the diagonal distance D or the diagonal length M, respectively.

The flange surface 15 is shorter measured in the circumferential direction of the groove profile 9 than the flange surface 14. In detail the profile width of the flange surface 15 is 10 through 20% of the lateral length S of the hexagon nut profile 12. A preferred dimensioning of the shorter flange surface 15 is 12% of the lateral length S of the hexagon nut profile 12. By this dimensioning it is reached that in such a case the specific arc section of the cylinder casing 6 between adjacent axial profile webs 9 deforms approximately to the lateral length S if the end edges of the shorter flanges glide over the edge of the hexagon nut profile 12. Therefore unelastic excessive elongation does not occur. The arc portions of the cylinder casing are deformed thereby substantially along a chord.

The broader flange surface 14, in the circumferential direction, has a width which exceeds 15% of the lateral length S of the hexagon profile 12. Thereby an overturning of the plastic protecting cap during the tightening movement is excluded. In fact, an elastic deformation of the cylinder casing then is not possible any more so far that the broader flange glide over the edges of the nut.

The plastic protecting cap has on the head portion 7 a hexagon profile 17, that is equal to the hexagon nut profile 12 of the hexagon nut 3, so that the same wrench can be used with the hexagon nut profile 12 and/or the hexagon profile 17.

The functioning of the plastic protecting cap is evident substantially from the above description. In the orientation according to FIG. 3, where the axial profile webs are oriented about to the center of the sides of the hexagon nut profile 12, it is possible to push on the plastic protecting cap in the axial direction to the hexagon nut 3. A wrench is placed on the hexagon profile 17 of the head portion 7. A clockwise rotation, related to FIG. 3, is effected, consequently also in the tightening direction of the hexagon nut, whereby the plastic protecting cap is tightened and the position according to FIG. 4 is reached. Thereby the end edges of the shorter flange surfaces 15 slide in each case over the edges of the hexagon nut profile 12. The arc portions of the cylinder casing each situated between adjacent axial profile webs 9 are deformed to chord portions so that the end edges of the flange surfaces 15 may glide over the edges of the hexagon nut profile 12 without excessive elongation.

In the position according to FIG. 4 the groove profiles 10 are placed in a form-locking and friction-locking manner on the edges of the hexagon nut profile 12. The large contact surfaces of the groove profiles 10 and the elastic deformation and tension forces secure a form-locking and friction-locking so that the plastic protecting cap 5 cannot be removed any more in the axial direction. Also a loosening or releasing of the plastic protecting cap 5 is not possible. An overturning during the tightening movement is excluded by the longer flange surfaces 14, because the end edges thereof can not glide over the edges of the hexagon nut profile without an unelastic excessive elongation. However, for this such an extreme force would be necessary that the plastic protecting cap would be destroyed.

Figure 2:
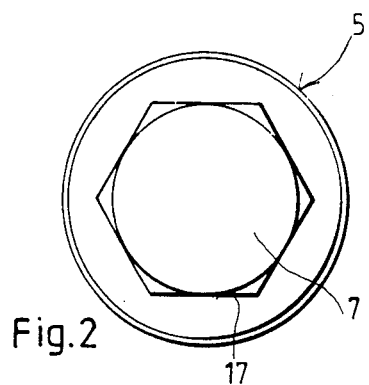
FIG. 2 is a plan view of the plastic protecting cap.

The loosening of the plastic protecting cap is carried out by rotating the hexagon profile 17 anticlockwise, related to FIGS. 2 and 4. Thereby the plastic protecting cap 5 can be turned back into the position according to FIG. 3 and can be removed in the axial direction from the hexagon nut 3. The plastic protecting cap may be operated from one front end, and engaging over the axial length is not necessary.

We claim the following:

1. A plastic protecting cap adapted to fit over a polygon nut having a plurality of polygonal corners each with a polygon angle, the protecting cap comprising:
   (a) a generally cylindrical casing; and
   (b) a plurality of radially inwardly extending webs, each web comprising:
      (i) a first flange surface;
      (ii) a second, longer flange surface; and,
      (iii) an axially extending groove, the sides of the groove defining a vertex angle approximately equal to the polygon angle, the radial distance from a central axis to the vertex of the vertex angle being smaller than the radial distance from a central axis to the polygon corners of the nut.

2. The protecting cap according to claim 1 wherein the polygon nut has a plurality of sides each having a lateral length S and wherein the first, shorter flange surface of each web has a width in the circumferential direction of between 10%–20% of S.

3. The protecting cap according to claim 1 wherein the radial distance between a central axis and the vertex of the vertex angle is between 3% and 5% smaller than the radial distance between a central axis and the polygon corners of the nut.

4. A plastic protecting cap according to claim 1 wherein the polygon nut has a hexagon nut profile, and wherein six axial profile webs are provided on the casing.

5. The protecting cap according to claim 4 wherein each side of the hexagon nut has a lateral length S and wherein the first, shorter flange surface of each web has a width in the circumferential direction of approximately 12% of S.

6. The protecting cap according to claim 4 wherein each side of the hexagon nut has a lateral length S and wherein the second, longer flange surface of each web has a width in the circumferential direction of greater than 15% of S.

7. A plastic protecting cap according to claim 4, wherein the cylinder casing further comprising a stepped head portion with a hexagon profile similar to the hexagon nut profile of the hexagon nut.

8. A plastic protecting cap according to claim 7, wherein the first, shorter flange surface of the groove profile in each web is oriented in the tightening direction of the hexagon nut.

* * * * *